United States Patent
Cailler et al.

(10) Patent No.: US 10,600,260 B2
(45) Date of Patent: Mar. 24, 2020

(54) METHOD AND SYSTEM FOR DETECTING THE ABSENCE OF UNDER ENGINE PROTECTION

(71) Applicants: Continental Automotive France, Toulouse (FR); Continental Automotive GmbH, Hannover (DE)

(72) Inventors: Lionel Cailler, Sainte Foy de Peyrolieres (FR); Stéphane Eloy, Tournefeuille (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/311,917

(22) PCT Filed: Jun. 30, 2017

(86) PCT No.: PCT/FR2017/051766
§ 371 (c)(1),
(2) Date: Dec. 20, 2018

(87) PCT Pub. No.: WO2018/002551
PCT Pub. Date: Jan. 4, 2018

(65) Prior Publication Data
US 2019/0213807 A1    Jul. 11, 2019

(30) Foreign Application Priority Data
Jun. 30, 2016    (FR) ...................................... 16 56230

(51) Int. Cl.
*G07C 5/08*    (2006.01)
*F01P 1/06*    (2006.01)
(Continued)

(52) U.S. Cl.
CPC ........ *G07C 5/0808* (2013.01); *B60R 13/0838* (2013.01); *B60R 13/0861* (2013.01);
(Continued)

(58) Field of Classification Search
CPC ......... B60K 11/00; B60K 11/02; B60R 13/00; B60R 13/08; B60R 13/0838;
(Continued)

(56) References Cited

U.S. PATENT DOCUMENTS

2001/0039927 A1    11/2001    Oishi
2007/0033998 A1*    2/2007    Wakahara ................ F01P 11/14
                                                        73/114.68

FOREIGN PATENT DOCUMENTS

DE    3735921 C1    12/1988
EP    2623401 A1    8/2013
FR    2957558 A1    9/2011

OTHER PUBLICATIONS

International Search Report and Written Opinion for International Application No. PCT/FR2017/051766, dated Sep. 15, 2017—7 pages.

(Continued)

*Primary Examiner* — Charles J Han
(74) *Attorney, Agent, or Firm* — RatnerPrestia

(57) ABSTRACT

A method for diagnosing the absence of an under-engine protection of a motor vehicle, includes: estimating a temperature of air external to the vehicle, estimating an under-hood temperature, determining whether the external-air temperature value is below the under-hood temperature value, in the affirmative, calculating an absolute value of a difference between the external-air temperature measurement and the under-hood temperature measurement, determining a diagnostic criterion by calculating a difference between the absolute value and a predetermined absolute value, obtained (Continued)

in the presence of the under-engine protection, comparing the diagnostic criterion against a predetermined diagnostic threshold, and emitting a diagnostic signal dependent on the result of the comparison.

13 Claims, 2 Drawing Sheets

(51) Int. Cl.
*B60R 13/08* (2006.01)
*B62D 35/02* (2006.01)
*G07C 5/10* (2006.01)
*F01P 1/00* (2006.01)
*B60K 11/02* (2006.01)
*F01P 3/20* (2006.01)

(52) U.S. Cl.
CPC ............... *B62D 35/02* (2013.01); *F01P 1/06* (2013.01); *G07C 5/10* (2013.01); *B60K 11/02* (2013.01); *F01P 3/20* (2013.01); *F01P 2001/005* (2013.01); *F01P 2025/13* (2013.01); *F01P 2025/48* (2013.01); *F01P 2025/66* (2013.01)

(58) Field of Classification Search
CPC .... B60R 13/0861; B62D 35/00; B62D 35/02; F01P 1/00; F01P 1/06; F01P 2001/005; F01P 2025/00; F01P 2025/08; F01P 2025/13; F01P 2025/48; F01P 2025/60; F01P 2025/66; F01P 3/00; F01P 3/20; G07C 5/00; G07C 5/08; G07C 5/0808; G07C 5/10
See application file for complete search history.

(56) References Cited

OTHER PUBLICATIONS

English translation of the Written Opinion for International Application No. PCT/FR2017/051766, dated Sep. 15, 2017—4 pages.

* cited by examiner

METHOD AND SYSTEM FOR DETECTING THE ABSENCE OF UNDER ENGINE PROTECTION

CROSS REFERENCE TO RELATED APPLICATIONS

This application is the U.S. National Phase Application of PCT International Application No. PCT/FR2017/051766, filed Jun. 30, 2017, which claims priority to French Patent Application No. 1656230, filed Jun. 30, 2016, the contents of such applications being incorporated by referenced herein.

FIELD OF THE INVENTION

The invention relates to the field of motor vehicle engine management and more particularly to a method for diagnosing the absence of an under-engine protection.

The invention also relates to a diagnostic system implementing the method.

BACKGROUND OF THE INVENTION

The under-engine protection is a component situated beneath the engine of a motor vehicle and which protects the engine from anything thrown up off the road surface (e.g. stone chippings, winter gritting solutions, uneven ground) in addition to protecting the environment from undesirable losses (for example engine oil) from the engine. The under-engine protection also acts as a "ski" for the vehicle in the event of contact with the ground while at the same time soundproofing the bottom of the bodyshell against road noise.

The under-engine protection is also known by the names of "under-engine cover", "under-engine protective shield", "under-bottom shield" or else "engine undertray".

The under-engine protection is a removable element that can be deliberately detached, for example for performing an oil change. In that case, the refitting of same is sometimes overlooked. The under-engine protection may also become detached unintentionally while the vehicle is driving along, for example if the fixing screws become detached. In both these scenarios, the driver of the vehicle may drive on without the under-engine protection without realizing this, thus exposing the engine and the environment to the risks listed above.

SUMMARY OF THE INVENTION

It would be desirable to be able to detect the absence of the under-engine protection and to inform the driver of the vehicle of this absence so that he can get it refitted.

An aspect of the present invention aims to alleviate the aforementioned problem using the engine management mechanism and notably using information that allows regulation of the engine temperature. For that, an aspect of the invention proposes a diagnostic method which makes it possible to deduce the absence of a motor vehicle under-engine protection by monitoring the variation in the difference between the temperature of air external to the vehicle and the temperature of the air passing through the engine compartment of the vehicle.

To this end, a first aspect of the invention proposes a method for diagnosing the absence of an under-engine protection of a motor vehicle. The method is characterized in that it comprises the following steps:

measuring or estimating a temperature indicative of the temperature of air external to the vehicle, measuring or estimating a temperature indicative of the temperature of the air passing through the engine compartment of the vehicle, referred to as the under-hood temperature, determining whether the external-air temperature value is below the under-hood temperature value, if the determination is in the affirmative, calculating a first absolute value of a difference between the external-air temperature measurement and the under-hood temperature measurement, determining a first diagnostic criterion by calculating a difference between said first absolute value and a predetermined first absolute value for a difference between the external-air temperature and the under-hood temperature, obtained in the presence of the under-engine protection, comparing the first diagnostic criterion against at least one first predetermined diagnostic threshold, and emitting a diagnostic signal dependent on the result of the comparison.

This offers the advantage of economy and simplicity, because it makes use of elements and information currently accessible without the need to add additional components.

In a first embodiment, the method further comprises the following steps, when the vehicle is in motion:

measuring a current speed of the vehicle, and selecting the predetermined absolute value according to the current-speed measurement.

In a second embodiment, the comparison step of the method further comprises the following steps, when an engine cooling fan is not switched on:

measuring a rotational speed of the fan, determining a fourth diagnostic criterion by calculating a difference between the measured rotational speed of the fan and a predetermined rotational speed obtained in the presence of the under-engine protection, comparing the fourth diagnostic criterion against at least one fourth predetermined diagnostic threshold, and emitting a third diagnostic signal dependent on the result of the comparison.

In a third embodiment, the method further comprises the following steps, when the vehicle engine is off:

measuring a time that has elapsed since the vehicle engine was switched off, and selecting the predetermined absolute value according to the elapsed-time measurement.

In a fourth embodiment, the comparison step of the method further comprises the following steps, when an engine cooling fan is not switched on:

measuring a coolant inlet temperature at the inlet of an engine cooling radiator, measuring a coolant outlet temperature at the outlet of the engine cooling radiator, measuring a flow rate of the coolant flowing through the radiator, calculating a second absolute value for a difference between the measured inlet temperature and the measured outlet temperature for the coolant flowing through the radiator, determining a second diagnostic criterion by calculating a difference between the second absolute value and a predetermined second absolute value for a difference between the inlet temperature and the outlet temperature of the coolant circulating through the radiator, obtained in the presence of the under-engine protection, determining a third diagnostic criterion by calculating a difference between the value of the flow rate of coolant circulating through the radiator and a predetermined flow rate value obtained in the presence of the under-engine protection, comparing the second diagnostic criterion against at least one second predetermined diagnostic threshold, comparing the third diagnostic criterion against at least one third predetermined diagnostic threshold, and emitting a second diagnostic signal dependent on the result of the comparisons.

In a sixth embodiment, the step of measuring the under-hood temperature further comprises the following steps:

measuring a temperature of at least one element of the engine compartment, and deducing the under-hood temperature measurement from at least the measured temperature of the element of the engine compartment.

In a seventh embodiment, the step of measuring the external-air temperature further comprises the following steps:

measuring a temperature of the air admitted to the engine, and deducing the external-air temperature measurement from at least the measured temperature of the admitted air.

In an eighth embodiment, the method further comprises the following steps:

during a predetermined measurement period, taking a plurality of measurements of the external-air temperature and of the under-hood temperature, calculating a mean value for the external-air temperature and for the under-hood temperature from, respectively, the external-air temperature measurements and the under-hood temperature measurements, and determining the first diagnostic criterion from the mean external-air temperature and mean under-hood temperature values.

In a second aspect, the invention also relates to a system for diagnosing the absence of an under-engine protection of a motor vehicle, characterized in that it comprises:

first measurement means for measuring or estimating a temperature indicative of the temperature of air external to the vehicle, second measurement means for measuring or estimating a temperature indicative of the temperature of the air passing through the engine compartment of the vehicle, referred to as the under-hood temperature, first comparison means for determining whether the external-air temperature value is below the under-hood temperature value, calculation means for calculating, if the output from the first comparison means is in the affirmative, a first absolute value of a difference between the external-air temperature measurement and the under-hood temperature measurement, determination means for determining a first diagnostic criterion by calculating a difference between said first absolute value and a predetermined first absolute value for a difference between the external-air temperature and the under-hood temperature, obtained in the presence of the under-engine protection, second comparison means for comparing the first diagnostic criterion against at least one first predetermined diagnostic threshold, and emission means for emitting a diagnostic signal dependent on the output of the second comparison means.

In one embodiment, the system further comprises, when an engine cooling fan is not switched on:

third measurement means for measuring a coolant inlet temperature at the inlet of an engine cooling radiator, fourth measurement means for measuring a coolant outlet temperature at the outlet of the engine cooling radiator, fifth measurement means for measuring a flow rate of the coolant flowing through the radiator, the calculation means are also configured for calculating a second absolute value for a difference between the measured inlet temperature and the measured outlet temperature for the coolant flowing through the radiator, determining a second diagnostic criterion by calculating a difference between the second absolute value and a predetermined second absolute value for a difference between the inlet temperature and the outlet temperature of the coolant circulating through the radiator, obtained in the presence of the under-engine protection, the determination means are also configured for determining a third diagnostic criterion by calculating a difference between the value of the flow rate of coolant circulating through the radiator and a predetermined flow rate value obtained in the presence of the under-engine protection, the second comparison means are also configured for comparing the second diagnostic criterion against at least one second predetermined diagnostic threshold, the second comparison means are also configured for comparing the third diagnostic criterion against at least one third predetermined diagnostic threshold, and the emission means are also configured for emitting a second diagnostic signal dependent on the result of the comparisons.

BRIEF DESCRIPTION OF THE DRAWINGS

Other features and advantages of aspects or the invention will become more apparent upon reading the description that will follow. This description is purely illustrative and should be read with reference to the appended drawings, in which.

In these figures, references that are identical or similar from one figure to another denote elements that are identical or analogous. For the sake of clarity, the elements shown are not to scale in relation to one another, unless indicated otherwise.

DETAILED DESCRIPTION OF THE PREFERRED EMBODIMENTS

Figure 1:
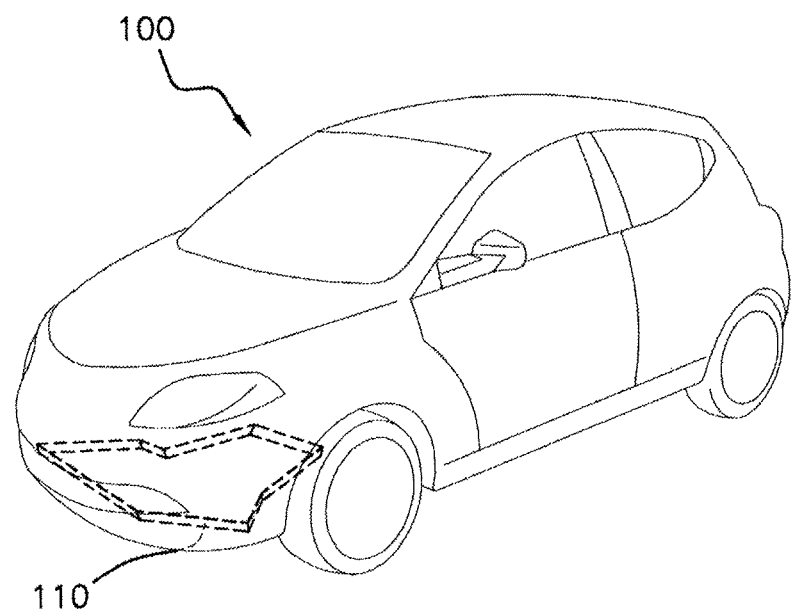
FIG. 1 is a schematic depiction of a motor vehicle equipped with an under-engine protection.

FIG. 1 schematically depicts a motor vehicle 100 equipped with an under-engine protection 110 (depicted in black). In the remainder of the description, the vehicle 100 will be considered to comprise an engine management mechanism and notably an engine management computer (not depicted) capable, in real-time, of managing all of the engine operating parameters.

Figure 2:
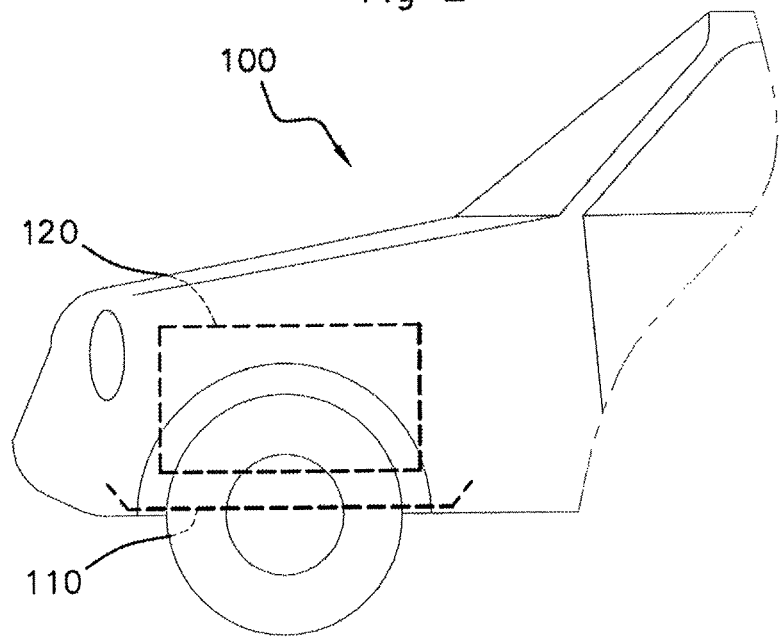
FIG. 2 is a schematic depiction in cross section through the hood of the vehicle of FIG. 1.

FIG. 2 schematically depicts, in cross section, the hood of the vehicle 100 in which the position of the under-engine protection 110 is indicated.

As illustrated in FIG. 2, the under-engine protection 110 is situated beneath an engine compartment 120 containing, amongst other things, the engine and the battery of the vehicle 100. In this way, the under-engine protection 110 protects the engine from things thrown up from the roadway in addition to protecting the environment from undesired losses from the engine, as indicated above.

In order to detect the absence of the under-engine protection 110 it could have been envisioned to use a presence sensor dedicated to that function. However, the inventors consider such a solution to be inappropriate from an industrial standpoint because it requires the addition of equipment, the cost of which may be high.

The inventors chose to tackle the problem of detecting the absence of the under-engine protection 110 from the viewpoint of the engine management mechanism of the vehicle 100. It is known that the engine management mechanism notably regulates the engine temperature by considering, in the control model, the engine within a confined space, namely with the under-engine protection 110 present. Thus, the presence of the under-engine protection 110 is of prime importance to ensuring that all the normal operating conditions for the engine management mechanism are simultaneously present. Conversely, if the absence of the under-engine protection 110 is not detected, the normal operating conditions for the engine management mechanism will no longer be simultaneously present and the engine computer will attempt to optimize combustion which will no longer be optimal because of the change to the original characteristics of the bottom part of the engine, thus generating excessive pollution. Specifically, without the under-engine protection 110, the engine operating temperature will be lower than the optimal operating temperature (for example around 90° C.), thus generating pollution.

The hood of the vehicle 100 can be likened to a cube which is partially open on one face, namely the radiator grille which allows air in to ventilate the engine compartment 120. It is known that this incoming air flow is discharged through small orifices on the other faces of the cube, which is therefore not completely closed. However, if the under-engine protection 110 is absent, a profound change to the geometry of the cube may be observed. Specifically, in such a case, the lower face of the cube will be open such as to deflect the air flow entering via the front face of the cube. In addition, when the vehicle 100 is running, a Venturi effect causes a larger amount of air to be drawn in which means that the engine compartment 120 will be better ventilated than it is when the under-engine protection 110 is present. Stated differently, the air entering under the hood of the vehicle 100, when the under-engine protection 110 is absent, has a direct impact on the temperature of the air circulating in the engine compartment 120. In general, the greater air flow created by the absence of the under-engine protection 110 dissipates more heat, which means that the temperature of the air circulating in the engine compartment 120 is closer to the external-air temperature. In this way it is possible to diagnose the absence of the under-engine protection 110 by monitoring the variation in the difference between the temperature of air external to the vehicle 100 and the temperature of the air passing through the engine compartment of the vehicle 100. The monitoring can be done as a function of time, so as to avoid unwanted false detections. Furthermore, a filter can be used for unwanted false detections. In that case, a diagnostic signal may be emitted when a counter that a diagnostic threshold has been crossed is reached.

Figure 3:
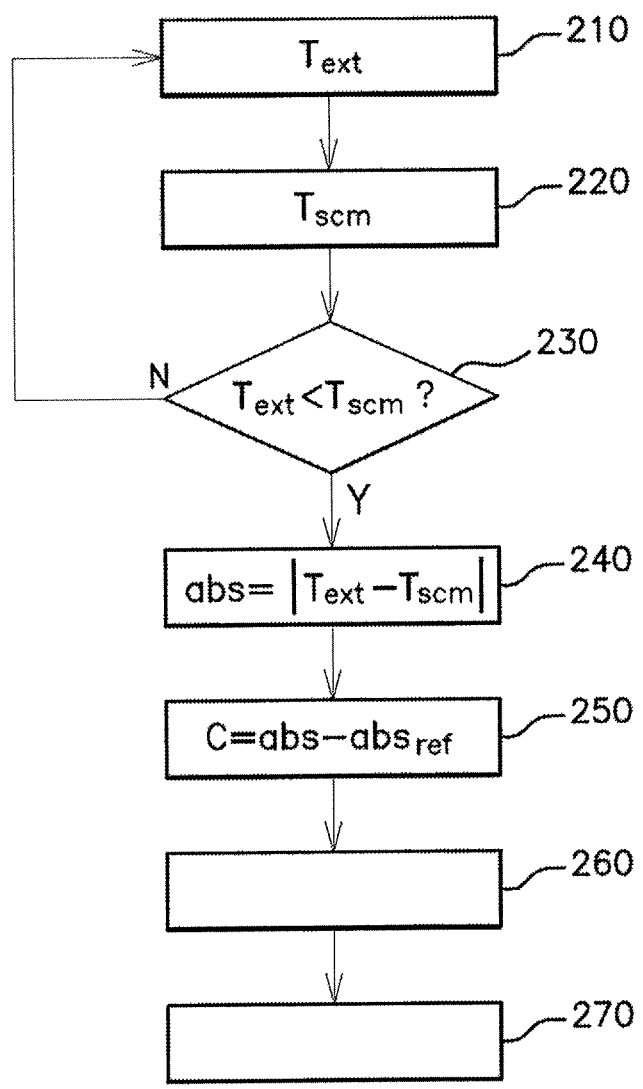
FIG. 3 is a flow diagram illustrating the various steps of the diagnostic method according to an aspect of the invention.

To this end, the method illustrated in the flow diagram of FIG. 3 is proposed.

In the first step 210, a temperature indicative of the temperature $T_{ext}$ of air external to the vehicle 100 is measured or estimated.

In one particular embodiment of this step, a temperature of the air admitted to an air intake pipe leading toward the engine may be measured in order therefrom to deduce the external-air temperature $T_{ext}$ from at least the measured admitted-air temperature. Specifically, the temperature of the air admitted to the engine is fairly close to the incoming air flow and therefore constitutes a valid estimate of the external-air temperature. However, there are other methods that can be used for determining the external-air temperature $T_{ext}$. For example, it is possible to estimate the external-air temperature $T_{ext}$ from a temperature measured at the inlet of a turbocompressor, by correcting this turbocompressor inlet temperature as a function of the operating parameters and therefore of the potential for heating of the engine compartment 120, and also correcting it as a function of whether an engine compartment cooling fan is active or inactive. In another embodiment, an external-temperature sensor can be used to determine the temperature $T_{ext}$ of air external to the vehicle 100.

Returning to FIG. 3, in the step 220, a temperature indicative of the temperature of the air passing through the engine compartment of the vehicle 100 is measured or estimated. In the remainder of this description, this temperature, the under-hood temperature, will be referred to as $T_{scm}$.

In one particular embodiment, a temperature of at least one element of the engine compartment 120 is measured, in order therefrom to deduce the under-hood temperature $T_{scm}$ from the measured temperature of the engine compartment element. For example, one of the elements of the engine compartment 120 to be taken into consideration may be the battery of the vehicle 100. Specifically, in practice, the inventors have noted that the mean temperature of the battery of the vehicle 100 over a given period (e.g. 5 minutes) is a good indicator of the thermal environment of the engine compartment 120.

For engine temperature, some vehicles have a thermometric probe comprising a PTC (Positive Temperature Coefficient) thermistor, the resistance of which varies with temperature along a predefined curve. It is also possible to envision calculating a mean temperature of the elements situated in the engine compartment 120 in order to estimate the under-hood temperature $T_{scm}$.

Step 230 of FIG. 3 involves determining whether the external-air temperature value $T_{ext}$ is lower than the under-hood temperature value $T_{scm}$.

If the determination is in the negative, the method returns to step 210, as described above.

If, on the other hand, the determination is in the affirmative, that is to say positive, the method of FIG. 3 continues on to step 240 in which an absolute value abs for a difference between the measured external-air temperature $T_{ext}$ and the measured under-hood temperature $T_{scm}$ is calculated.

In step 250 a diagnostic criterion C is determined by calculating a difference between the absolute value abs and a predetermined absolute value $abs_{ref}$ for a difference between the external-air temperature $T_{ext}$ and the under-hood temperature $T_{scm}$, obtained in the presence of the under-engine protection. In one example, the predetermined absolute value $abs_{ref}$ is stored in a memory of the engine management computer. In one embodiment, the predetermined absolute value $abs_{ref}$ is obtained from external-air temperature $T_{ext}$ and under-hood temperature $T_{scm}$ measurements taken in the context of a testbed. However, it is just as conceivable to obtain these measurements in a real situation, for example on the road.

In step 260, the diagnostic criterion C is compared to at least one predetermined diagnostic threshold S. In one example, the diagnostic criterion C may be compared to a numerical temperature-difference value. In another example of diagnostic criteria, the diagnostic criterion C may be compared to a range of numerical temperature-difference values.

Finally, in step 270, a diagnostic signal Sd dependent on the result of the comparison is emitted. In one example, the diagnostic signal Sd is an MIL (Malfunction Illumination Lamp) visible to the driver. Furthermore, when the diagnostic criterion C is compared against a predetermined numerical value, the diagnostic signal may be emitted when the diagnostic criterion C is below the predetermined numerical value. In such a scenario, the predetermined numerical value corresponds to a threshold below which it is considered that the under-engine protection 110 is absent. In another example, when the diagnostic criterion C is compared against a range of predetermined numerical values, the signal may be emitted when the diagnostic criterion C is outside the range of predetermined numerical values. In such a scenario, the range of predetermined numerical values corresponds to an interval within which it is considered that the under-engine protection 110 is present. Conversely, the under-engine protection 110 is considered to be absent when the diagnostic criterion C is outside this range of predetermined numerical values. However, it is possible to envision the function of the predetermined diagnostic threshold S differently from what has just been described. Specifically, the predetermined diagnostic threshold S has the function of discriminating between whether or not the under-engine protection 110 is present.

The method of FIG. 3 can be envisioned according to whether the vehicle 100 is in motion or according to whether the engine of the vehicle 100 is off.

When the vehicle 100 is in motion, the method of FIG. 3 may be supplemented by the measuring of a current speed Vc of the vehicle 100 and by the selection of the predetermined absolute value $abs_{ref}$ according to the measured current speed Vc. For example, the vehicle 100 may be moved by the engine. In another example, the vehicle 100 may be in motion thanks to the speed induced by inertia even though it is in a deceleration phase. The vehicle 100 may also be in motion but with the engine cut off and running on a downhill slope.

Furthermore, in the same vein, it is possible to envisage supplementing the aforementioned diagnostic with diagnostic relating to the flow rate and temperature of a coolant that cools the engine of the vehicle 100. Specifically, the variation in the temperature of the coolant across the radiator as a function of the coolant flow rate, is a good indicator of the temperature of the air circulating within the engine compartment 120. Nevertheless, in this embodiment, the situation in which a cooling fan of the vehicle 100 is not in operation is envisioned. What that means is that consideration is given to the scenario in which the blades of the cooling fan are autorotating. In this particular embodiment, a coolant inlet temperature $T_e$ at the inlet to an engine cooling radiator (not depicted) is measured. Next, a coolant outlet temperature $T_s$ at the outlet of the engine cooling radiator is measured. An absolute value $abs_1$ is then calculated for a difference between the inlet temperature $T_e$ and the outlet temperature $T_s$. A diagnostic criterion $C_1$ is then determined by calculating a difference between the absolute value $abs_1$ and a corresponding predetermined absolute value $abs_{ref1}$, obtained in the presence of the under-engine protection 110. Furthermore, in this embodiment, a flow rate for the coolant circulating through the radiator is determined. A diagnostic criterion $C_2$ is then determined by calculating a difference between the value of the flow rate of coolant circulating through the radiator and a predetermined flow rate value obtained in the presence of the under-engine protection 110. Thereafter, the diagnostic criterion $C_1$ is compared to at least one predetermined diagnostic threshold $S_1$ and the diagnostic criterion $C_2$ is compared against at least one predetermined diagnostic threshold $S_2$. Finally, a diagnostic signal Sdi dependent on the result of the comparisons which are taken into consideration cumulatively, is emitted. In this embodiment, too great a difference between the inlet temperature $T_e$ and the outlet temperature $T_s$ as a function of the flow rate of the coolant circulating through the radiator indicates that too great a quantity of heat has been extracted as a result of a significant air flow through the radiator caused by the absence of, the under-engine protection 110.

In another embodiment, the autorotation of the fan blades of the fan that cools the vehicle 100 may also be taken into consideration. In this particular embodiment, a rotational speed Vr of the fan blades caused by the movement of the vehicle 100 is measured. Next, a diagnostic criterion $C_3$ is determined by calculating a difference between the measured rotational speed Vr of the fan and a predetermined rotational speed $Vr_{ref}$ obtained in the presence of the under-engine protection 110, so, by comparing the diagnostic criterion $C_3$ against at least one predetermined diagnostic threshold $S_3$. Finally, a diagnostic signal $Sd_3$ dependent on the result of the comparison is emitted. In this embodiment, an excessive speed of the cooling fan blades indicates a significant air flow passing through the radiator grille as a result of the absence of the under-engine protection 110. In one example, it is possible to envision the use of a cooling fan configured to indicate the rotational speed Vr of its blades. However, the use of any measurement means making it possible to obtain the rotational speed Vr is equally envisioned.

When the engine of the vehicle 100 is off, the method of FIG. 3 may be supplemented by the measuring of time elapsed since the engine of the vehicle 100 was stopped, and by the selection of the predetermined absolute value $abs_{ref}$ according to the measured elapsed time. Specifically, after the engine is switched off, the under-hood temperature $T_{scm}$ evolves according to a function that can be characterized by measurement. In practice, the under-hood temperature $T_{scm}$ begins by rising by convection, because the water pump is no longer activated, and then begins to fall by thermal diffusion and lack of combustion. This embodiment may also be applied during the procedure referred to as "power latch" during which, when the driver switches off the engine, the engine management computer remains active for enough time for all of the elements associated with the computer to complete their action (for example, for a few tens of seconds). However, in the context of "power latch" it is conceivable to extend the period of activity of the computer, in order to have enough time available to avoid unwanted false detections of the absence of the under-engine protection 110. For example, a duration of two minutes may be envisioned. Another approach may be to envision various strategies for waking up the engine management computer so that it is woken up after a predetermined length of time so as to diagnose the absence of the under-engine protection 110. For example, the decision may be made to retain the current "power latch" operation so that the computer is switched off after a few tens of seconds, and then to contrive for the computer to be woken up after two minutes, for example, before being powered down again.

An aspect of the invention has a number of advantages. Specifically, by virtue of the method according to an aspect of the invention it is possible to detect the absence of the under-engine protection 110 in order to be able to alert the motorist and/or a garage mechanic, and to do so with a view to limiting pollution caused by suboptimal combustion brought about by the engine management mechanism. Furthermore, that has the advantage of avoiding accelerated aging of the components exposed to inclement weather as a consequence of the absence of the under-engine protection 110. An aspect of the invention also makes it possible to take into consideration information regarding the absence of the under-engine protection in the temperature regulation models that the engine management mechanism uses and to do so for the purposes of optimizing combustion and reducing fuel consumption and pollutant emission.

An aspect of the present invention has been described and illustrated in the present detailed description and in the figures of the appended drawings. Aspects of the present invention are not limited to the embodiments thus presented, however. Other variants and embodiments may be deduced and implemented by a person skilled in the art after reading the present description and studying the appended drawings. A system for diagnosing the absence of an under-engine protection of a motor vehicle for implementing the method described hereinabove is also claimed. The diagnostic system claimed comprises measurement means for measuring a temperature of air external to the vehicle, such as a temperature sensor placed on the exterior of the vehicle and/or in the air intake pipe leading to the engine. The diagnostic system also comprises measurement means for measuring a temperature of the air passing through the engine compartment of the vehicle, such as a coolant-temperature sensor and/or of one of the elements of the engine compartment, such as the battery. The diagnostic system comprises calculation means such as a microprocessor coupled to a memory in order to perform, according to the method of FIG. 3, comparisons, calculations, and to generate a diagnostic signal. Finally, the diagnostic system comprises communication means such as a wireless or wired emitter, for example for emitting at least one diagnostic signal rendered visible to the driver and/or to a tool that is used by a garage mechanic.

In the claims, the term "include" does not exclude other elements or other steps. The various features described and/or claimed may advantageously be combined. Their presence in the description or in various dependent claims does not exclude this possibility. Lastly, the reference signs in the figures of the drawings should not be understood as limiting the scope of aspects of the invention.

The invention claimed is:

1. A method for diagnosing the absence of an under-engine protection of a motor vehicle, the method comprising:
   measuring or estimating a temperature value indicative of the temperature of air external to the vehicle, referred to as the external-air temperature value,
   measuring or estimating a temperature value indicative of the temperature of the air passing through the engine compartment of the vehicle, referred to as the under-hood temperature value,
   determining that the external-air temperature value is below the under-hood temperature value,
   calculating a first absolute value of a difference between the external-air temperature value and the under-hood temperature value responsive to determining that the external-air temperature value is below the under-hood temperature value,
   determining a first diagnostic criterion by calculating a difference between said first absolute value and a predetermined first absolute value of a difference between the external-air temperature value and the under-hood temperature value, obtained in the presence of the under-engine protection,
   diagnosing the absence of an under-engine protection of a motor vehicle by comparing the first diagnostic criterion against at least a first predetermined diagnostic threshold, and
   emitting a first diagnostic signal indicating the presence or the absence of the under-engine protection of the motor vehicle dependent on the diagnosis.

2. The method as claimed in claim 1, further comprising the following steps, when the vehicle is in motion:
   measuring a current speed of the vehicle, and
   selecting said predetermined first absolute value according to the current-speed measurement.

3. The method as claimed in claim 2, further comprising the following steps, when an engine cooling fan is not switched on:
   measuring a rotational speed of the fan,
   determining a second diagnostic criterion by calculating a difference between the measured rotational speed of the fan and a predetermined rotational speed obtained in the presence of the under-engine protection,
   diagnosing the absence of an under-engine protection of a motor vehicle by comparing the second diagnostic criterion against at least a second predetermined diagnostic threshold, and
   emitting a second diagnostic signal indicating the presence or absence of the under-engine protection of the motor vehicle dependent on the diagnosis comparing the second diagnostic criterion against the at least the second predetermined threshold.

4. The method as claimed in claim 2, further comprising the following steps, when an engine cooling fan is not switched on:
   measuring a coolant inlet temperature value at an inlet of an engine cooling radiator,
   measuring a coolant outlet temperature value at tan outlet of the engine cooling radiator,
   measuring a flow rate of coolant flowing through the radiator,
   calculating a second absolute value of a difference between the measured coolant inlet temperature value and the measured coolant outlet temperature value,
   determining a second diagnostic criterion by calculating a difference between the second absolute value and a predetermined second absolute value of a difference between the measured coolant inlet temperature value and the measured coolant outlet temperature value of coolant flowing through the radiator, obtained in the presence of the under-engine protection,
   determining a third diagnostic criterion by calculating a difference between a value of the flow rate of the coolant flowing through the radiator and a predetermined How rate value obtained in the presence of the under-engine protection,
   diagnosing the absence of an under-engine protection of a motor vehicle by comparing the second diagnostic criterion against at least a second predetermined diagnostic threshold, and comparing the third diagnostic criterion against at least a third predetermined diagnostic threshold, and emitting a second diagnostic signal indicating the presence or the absence of the under-engine protection of the motor vehicle dependent on the diagnosis comparing the second diagnostic criterion against the at least the second predetermined threshold, and comparing the third diagnostic criterion against the at least the third predetermined diagnostic threshold.

5. The method as claimed in claim 1, further comprising the following steps, when an engine cooling fan is not switched on:
measuring a rotational speed of the fan,
determining a second diagnostic criterion by calculating a difference between the measured rotational speed of the fan and a predetermined rotational speed obtained in the presence of the under-engine protection,
diagnosing the absence of an under-engine protection of a motor vehicle by comparing the second diagnostic criterion against at least a second predetermined diagnostic threshold, and
emitting a second diagnostic signal indicating the presence or the absence of the under-engine protection of the motor vehicle dependent on the diagnosis comparing the second diagnostic criterion against the at least the second predetermined threshold.

6. The method as claimed in claim 5, further comprising the following steps, when an engine cooling fan is not switched on:
measuring a coolant inlet temperature value at an inlet of an engine cooling radiator,
measuring a coolant outlet temperature value at an outlet of the engine cooling radiator,
measuring a flow rate of coolant flowing through the radiator,
calculating a second absolute value of a difference between the measured coolant inlet temperature value and the measured coolant outlet temperature value,
determining a second diagnostic criterion by calculating a difference between the second absolute value and a predetermined second absolute value of a difference between the measured coolant inlet temperature value and the measured coolant outlet temperature value of coolant flowing through the radiator, obtained in the presence of the under-engine protection,
determining a third diagnostic criterion by calculating a difference between a value of the flow rate of coolant flowing through the radiator and a predetermined flow rate value obtained in the presence of the under-engine protection,
comparing the second diagnostic criterion against at least a second predetermined diagnostic threshold,
comparing the third diagnostic criterion against at least a third predetermined diagnostic threshold, and
emitting a second diagnostic signal indicating the presence or the absence of the under-engine protection of the motor vehicle dependent on the diagnosis comparing the second diagnostic criterion against the at least the second predetermined threshold, and comparing the third diagnostic criterion against the at least the third predetermined diagnostic threshold.

7. The method as claimed in claim 1, further comprising, when the vehicle engine is off:
measuring a time that has elapsed since the vehicle engine was switched off, and selecting said predetermined first absolute value according to the measured time that has elapsed.

8. The method as claimed in claim 1, further comprising the following steps, when an engine cooling fan is not switched on:
measuring a coolant inlet temperature value at an inlet of an engine cooling radiator,
measuring a coolant outlet temperature value at an outlet of the engine cooling radiator,
measuring a flow rate of coolant flowing through the radiator,
calculating a second absolute value of a difference between the measured coolant inlet temperature value and the measured coolant outlet temperature value,
determining a second diagnostic criterion by calculating a difference between the second absolute value and a predetermined second absolute value of a difference between the measured coolant inlet temperature value and the measured coolant outlet temperature value of coolant flowing through the radiator, obtained in the presence of the under-engine protection,
determining a third diagnostic criterion by calculating a difference between a value of the flow rate of coolant flowing through the radiator and a predetermined flow rate value obtained in the presence of the under-engine protection,
diagnosing the absence of an under-engine protection of a motor vehicle by comparing the second diagnostic criterion against at least a second predetermined diagnostic threshold, and corn paring the third diagnostic criterion against at least a third predetermined diagnostic threshold, and
emitting a second diagnostic signal indicating the presence or the absence of the under-engine protection of the motor vehicle dependent on the diagnosis predetermined threshold, and comparing the third diagnostic criterion against the at least the third predetermined diagnostic threshold.

9. The method as claimed in claim 1, in which the step of measuring or estimating the under-hood temperature value further comprises:
measuring a temperature value of at least one element of the engine compartment, and
deducing the under-hood temperature-value from the measured temperature value of the at least one element of the engine compartment.

10. The method as claimed in claim 1, in which the step of measuring or estimating the external-air temperature value further comprises:
measuring a temperature value of air admitted to the engine, and
deducing the external-air temperature value from the measured temperature value of the air admitted to the engine.

11. The method as claimed in claim 1, further comprising:
during a measurement period, measuring a plurality of values of the external-air temperature and of the under-hood temperature,
calculating the mean value of the measured values of the external-air temperature and the mean value of measured values of the under-hood temperature, and
determining the first diagnostic criterion from the mean value of the external-air temperature and the mean value of the under-hood temperature.

12. A system for diagnosing the absence of an under-engine protection of a motor vehicle, comprising:

a first temperature sensor measuring or estimating a temperature value indicative of the temperature of air external to the vehicle, referred to as the external-air temperature value;

a second temperature sensor measuring or estimating a temperature value indicative of the temperature of the air passing through the engine compartment of the vehicle, referred to as the under-hood temperature value, at least one microprocessor configured to:
  determine that the external-air temperature value is below the under-hood temperature value,
  calculate a first absolute value of a difference between the external-air temperature value and the under-hood temperature value responsive to determining that the external-air temperature value is below the under-hood temperature value,
  determine a first diagnostic criterion by calculating a difference between said first absolute value and a predetermined first absolute value of a difference between the external-air temperature value and the under-hood temperature value, obtained in the presence of the under-engine protection,
  diagnosing the absence of an under-engine protection of a motor vehicle by comparing the first diagnostic criterion against at least a first predetermined diagnostic threshold, and an emitter configured to emit a first diagnostic signal indicating the presence or the absence of the under-engine protection of the motor vehicle based on the diagnosis.

13. The system as claimed in claim 12, further comprising, when an engine cooling fan is not switched on:
  a third temperature sensor measuring a coolant inlet temperature value at an inlet of an engine cooling radiator,
  a fourth temperature sensor measuring a coolant outlet temperature value at an outlet of the engine cooling radiator,
  a flow rate sensor measuring a flow rate of coolant flowing through the radiator,
  wherein the at least one microprocessor is further configured to:
  calculate a second absolute value of a difference between the measured coolant inlet temperature value and the measured coolant outlet temperature value,
  determine a second diagnostic criterion by calculating a difference between the second absolute value and a predetermined second absolute value of a difference between the measured coolant inlet temperature value and the measured coolant outlet temperature value of coolant flowing through the radiator, obtained in the presence of the under-engine protection,
  determine a third diagnostic criterion by calculating a difference between a value of the flow rate of coolant flowing through the radiator and a predetermined flow rate value obtained in the presence of the under-engine protection,
  diagnosing the absence of an under-engine protection of a motor vehicle by comparing the second diagnostic criterion against at least one second predetermined diagnostic threshold, and comparing the third diagnostic criterion against at least one third predetermined diagnostic threshold, and
  wherein the emitter is further configured to emit a second diagnostic signal indicating, the presence or the absence of the under-engine protection of the motor vehicle dependent on the diagnosis comparing the second diagnostic criterion against the at least one second predetermined threshold, and comparing the third diagnostic criterion against the at least one third predetermined diagnostic threshold.

* * * * *